US005764699A

United States Patent [19]
Needham et al.

[11] Patent Number: 5,764,699
[45] Date of Patent: Jun. 9, 1998

[54] METHOD AND APPARATUS FOR PROVIDING ADAPTIVE MODULATION IN A RADIO COMMUNICATION SYSTEM

[75] Inventors: Michael L. Needham, Palatine; Kenneth J. Crisler, Wheaton; Stephen S. Gilbert, Palatine, all of Ill.

[73] Assignee: Motorola, Inc., Schaumburg, Ill.

[21] Appl. No.: 221,325

[22] Filed: Mar. 31, 1994

[51] Int. Cl.⁶ .................................................... H04L 5/12
[52] U.S. Cl. ........................................ 375/261; 375/298
[58] Field of Search .................................. 375/259, 261, 375/286, 288, 264, 340, 349, 219, 298; 371/20.1; 455/226.1; 332/103

[56] References Cited

U.S. PATENT DOCUMENTS 5,333,148   7/1994   Tsubaki et al. ............... 375/229
5,363,408   11/1994  Paik et al. ..................... 375/261
5,418,815   5/1995   Ishikawa et al. ............... 375/321
5,577,087   11/1996  Furuya ............................ 375/377

OTHER PUBLICATIONS

Okada et al, "Design of all Digital Multi–Level Modulator and its application to Variable Capacity Transmission," Trans. of the Inst. of Electronics Informational & Conmunication Engineers 1992. vol. 375 B–II. Issue 6. pp. 9325–9336.

Primary Examiner—Tesfaldet Bocure
Assistant Examiner—Bryan Webster
Attorney, Agent, or Firm—George C. Pappas; James A. Coffing

[57] ABSTRACT

A method for providing adaptive modulation in a radio communication system employs a plurality of data modulation techniques (207). A two-way communication unit (100) automatically selects (318) from amongst the plurality of data modulation techniques (207), and uses the selected data modulation technique to transmit (308) data.

12 Claims, 2 Drawing Sheets

1

METHOD AND APPARATUS FOR PROVIDING ADAPTIVE MODULATION IN A RADIO COMMUNICATION SYSTEM

FIELD OF THE INVENTION

The present invention relates generally to radio communication systems, and more particularly to such systems that provide adaptive modulation schemes when transmitting data.

BACKGROUND OF THE INVENTION

Wireless data communications systems are known to include transmitting communication units and receiving communication units—e.g., two-way radios. It is further known that communication between these two radio units is facilitated through the use of a data transmission medium, such as radio frequency (RF) channels. The reliability of the communication between the two radio units depends on the channel conditions, or channel quality. That is, the channel condition—and hence, quality of the transmission—can vary as a result of external interference, attenuation caused by buildings, or other obstacles, as well as other factors including power variations and environmental conditions. These channel condition variations can be relatively abrupt, particularly in mobile and portable radio applications.

One approach to handle the widely varying channel conditions is to use a data transmission rate low enough to accommodate the worst expected conditions. However, this approach results in inefficient use of the available bandwidth, as the instantaneous channel conditions are often better than the worst expected conditions.

Another approach is to lower the transmission rate according to the quality of the established connection. As an example, wireline modems typically employ such a methodology by transmitting a known training sequence, from which an assessment can be made of the quality of the connection. After setting the initial transmission rate, the amount of errors detected at the receiving end is conveyed back to the transmitting end. If an excessive amount of errors are detected, communication is suspended, the training process is repeated, and the transmission rate is reduced until an acceptable performance level is reached. While this approach is acceptable where channel conditions are fairly stable, it is inappropriate in situations where the channel quality can either degrade or improve frequently over the course of a particular data session. That is, because the modem approach allows only for a decrease of transmission rate, the transmission rate cannot be increased to take advantage of improved channel conditions.

A third approach that does not rely on modifying the transmission rate is commonly referred to as an automatic repeat-request (ARQ) system. In such a system, the receiving radio unit detects which data frames are received in error and sends a feedback message to the transmitting end requesting that a particular frame, or group of frames, be re-transmitted. In this manner, the rate at which the data is sent over the channel is effectively increased or decreased, in response to the channel conditions. However, such a method requires a significant amount of overhead, both in channel utilization and in transmission delay. In particular, when channel conditions are poor over an extended period of time, the need for re-transmission is high, and the channel utilization is correspondingly low.

Different techniques for modulating data can be employed to achieve effective communication over a particular channel—e.g., N-ary quadrature amplitude modulation (N-QAM); where m is an integer value. The transmission rate is generally a function of the modulation technique used and any other factors that may tend to increase or decrease the effective data rate. Prominent among these factors is error correction coding, which decreases efficiency by taking up valuable bandwidth. Unfortunately, error correction is desirable when more advanced modulation techniques are used to send data at greater rates, since they are inherently less immune from channel induced errors. As an example, a system employing multi-level QAM modulation might also apply an error correction code known as trellis coding, which is designed to work with multilevel symbols. Such error correcting schemes typically increase the amount of overhead, thereby reducing the maximum rate at which data may be sent.

Lastly, because of the substantially different nature of the hardware required to modulate and demodulate signals sent using different modulation techniques, a communication system seldom employs more than one modulation technique for data communication. Instead, the system designer typically selects the single technique best suited to the general expected channel conditions. If channel conditions then degrade for any reason, other methods that do not involve altering the transmission rate or modulation technique must be employed.

Accordingly, there exists a need for a wireless data communications system that is not constrained by the limitations found in the prior art. In particular, such a system would be able to adaptively respond to varying channel conditions—both improvements and degradations—during a transmission by selecting an appropriate transmission technique. Lastly, such a system that could so adapt without the need for multiple modulation and demodulation hardware components would be an improvement over the prior art.

DETAILED DESCRIPTION OF A PREFERRED EMBODIMENT

Generally, the present invention provides a method for transmitting data using a selected one of a plurality of data modulation techniques. Selection amongst the plurality of data modulation techniques is automatically made during the transmission process. The selected data modulation technique is then used to transmit the data. By transmitting data in this manner, the present invention allows for enhanced utilization of the transmission medium, even under widely varying channel conditions.

Figure 1:
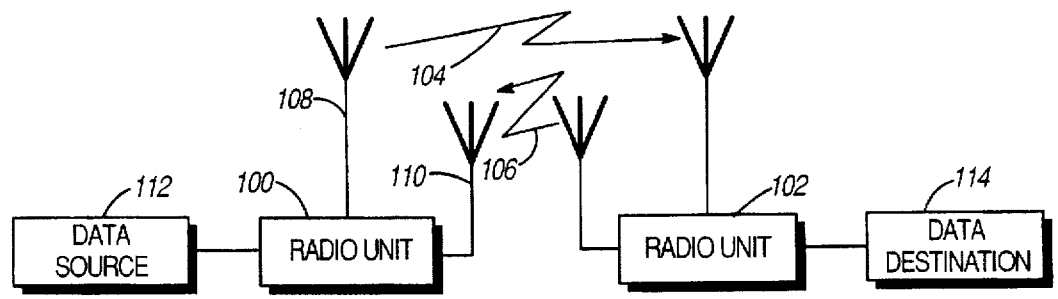
FIG. 1 shows a simplified block diagram of a pair of radio units that might employ the present invention.

The present invention can be more fully described with reference to FIGS. 1–4. FIG. 1 illustrates a data communication system that includes radio units 100, 102 that communicate with each other using radio frequency (RF) channels 104, 106. Such communication is facilitated through the use of a transmit antenna 108 and a receive antenna 110, which are used to transmit data from a data source 112 to a data destination 114. Of course, the communication direction may be reversed so as to facilitate transmission from a data source in the radio unit 102 to a data destination in the radio unit 100.

The radio units 100, 102 are typically two-way communication units such as a base station, console station, mobile, or portable radio, like those manufactured by Motorola, Inc.

It should be noted that the radio units 100, 102 can be, but are not limited to, any combination of the aforementioned embodiments. That is, the radio unit 100 may be a console station and the radio unit 102 may be a mobile radio, etc. However, to illustrate the invention, it is assumed that the radio unit 100 comprises a base station, such as the Motorola Integrated Radio System (MIRS) base station while radio unit 102 comprises a remote unit, such as a MIRS subscriber mobile transceiver.

Communication channels 104, 106 can be configured in several different ways. For example, the radio channels might be frequency division multiplexed (FDM)—i.e., separated by a predetermined frequency. Alternatively, they might be time division multiplexed (TDM)—i.e., with each channel occupying a separate time slot in a series of time slots on the radio channel. In a preferred embodiment, a combination of these techniques is used. That is, channels 104 and 106 are separated in frequency, while the radio messages sent in each direction over the channels occupy specific, non-overlapping time slots on the channels. In this manner, two-way communications can occur between the units 100 and 102, even though the units may have only half-duplex capability—i.e., cannot simultaneously transmit and receive.

A typical communication between, for example, a transmitting radio unit 100 and a receiving radio unit 102 might be as follows: data source 112 provides a data message to radio unit 100 for delivery to data destination 114. The data message might have been data entered into the data source 112 by a keyboard or some other input device, or stored in the data source, or even relayed to the data source from another location. The transmitting radio unit 100 formats the data message for transmission over the radio channel. The formatting process might include partitioning of the data message into multiple blocks for transmission over the channel, and/or adding error detection coding that would allow the receiver to determine which data blocks might have incurred errors during transmission. The formatted message is modulated onto a radio frequency (RF) carrier signal and transmitted over the channel 104.

Upon receiving the data message, the receiving radio unit 102 demodulates the modulated RF signal for further processing. If error detection coding is present in the data message, this processing would include determining, based on the error detection coding, whether or not any of the received data blocks have incurred errors. If the data blocks are determined to have been received without error, the receiving radio unit 102 reassembles the data message from the data blocks, and delivers it to data destination 114, where it may be stored, displayed on a terminal screen or another display device, or even relayed to some other destination.

In addition, the receiving radio unit 102 might also transmit a feedback message over the channel 106 to the transmitting radio unit 100, indicating whether or not all the data blocks were received without error. If not all the data blocks were received without error, the feedback message might include an indication as to which blocks were received incorrectly, as later described. Other information, such as the quality of the received radio transmission, which can be determined in ways later described, might also be included.

Figure 2:
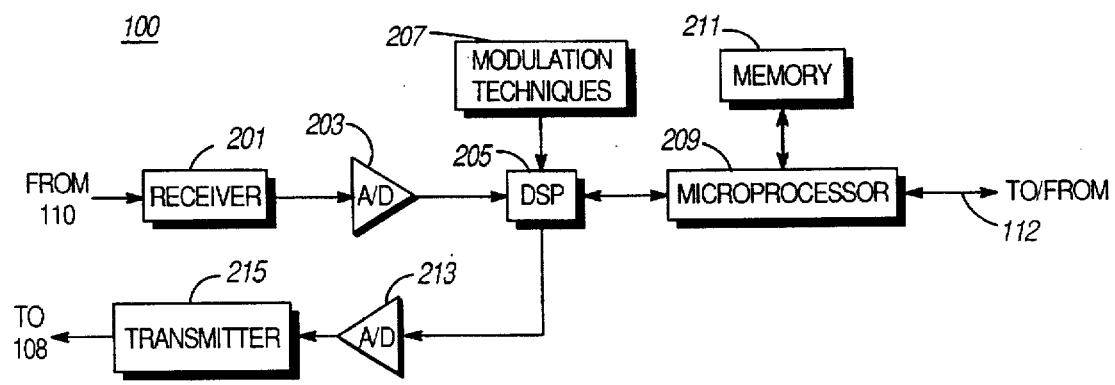
FIG. 2 shows a more detailed block diagram of one the radio units shown in FIG. 1.

FIG. 2 shows a more detailed block diagram of a transmitting/receiving radio unit, such as the radio unit 100 shown in FIG. 1, in accordance with a preferred embodiment of the invention. When receiving data, an RF receiver 201 processes the analog signals received from the antenna 110, which processed data is converted to digital form using a known analog-to-digital (A/D) converter 203. The digital information is then processed using a digital signal processor (DSP) 205, and demodulated according to one of several modulation techniques 207 programmed therein. The demodulated data is then processed to reconstruct the data message and detect any possible errors using a microprocessor 209. Relevant portions and characteristics of the data are stored in a memory 211 device and/or sent to a data destination (not shown). Likewise, when transmitting data sourced from data source 112, the microprocessor 209 and the memory 211 cooperate to prepare the information for transmission. The prepared information is then modulated using the DSP 205 and modulation techniques 207 programmed therein. The modulated data, still in digital form, is converted using a digital-to-analog (D/A) converter 213, and processed using an RF transmitter 215 for transmission using the antenna 108, which post-modulation sequence is well known to those skilled in the art.

The modulation technique is, in a preferred embodiment, chosen from those commonly referred to as N-ary quadrature amplitude modulation (N-QAM), where N is the number of discrete states—i.e., constellation points—contained in a modulated data symbol. Of those available, four are preferably used pursuant to the present invention, which include: 4-QAM,—also known as quadrature phase shift keying (QPSK); 16-QAM; 64-QAM; and 256-QAM.

Generally, the amount of data that may be sent over a given time period is proportional to the number of points in the constellation—assuming a constant channel bandwidth. However, modulation techniques that use a larger number of constellation points have a greater propensity for introducing errors over the communication channel, vis-a-vis those having fewer constellation points. With these characteristics in mind, it would be desirable to use the higher-level techniques—i.e., 64-QAM, or 256-QAM—for data communication channels having good quality, while lower-level modulation schemes—e.g., 16-QAM or QPSK-would be preferable for channels of low quality.

Referring again to FIG. 2, the four preferred modulation techniques for transmitting and receiving data are embodied in a memory element 207 of radio unit 100, typically in the form of software subroutines. During the process of modulation or demodulation, the desired technique is selected by the radio unit 100, according to the invention, and employed by the digital signal processor (DSP, 205) to effect the modulation or demodulation of the radio signal. As an example, the receiver circuit 201 detects a radio signal, and the received analog signal is converted to digital form using A/D converter 203. The digital signal is then demodulated by the DSP 205, using the software subroutine—retrieved from memory 207—that corresponds to the modulation technique used to transmit the data. A preferred method of determining which modulation technique was used for transmission is discussed below.

During the receipt and demodulation of the radio signal, the DSP 205 may also be used to make a direct measurement of the signal quality of the received signal. Several types of direct signal quality measurements are possible. For example, a direct measurement of received signal strength might be used as an indication of signal quality—i.e., received signal strength indication (RSSI). Additionally, the measurement might consist of an estimate of the ratio of desired signal power to interference plus noise power—(S/I+N)—based on analysis by the DSP of received data symbols.

When the radio unit 100 is configured to transmit, the formatted data to be transmitted is supplied to the DSP 205 from the microprocessor 209. The DSP 205 then executes the selected software subroutine from storage 207, effecting the modulation of the data. The digitized, modulated data is then converted to analog form by a D/A converter 213, and transmitted using RF transmitter section 215. Preferred methods for selecting the transmission modulation technique are described below.

In a preferred embodiment, the data transmission process begins when a data message is received from a data source 112—which can be a conventional keyboard, a data terminal, or even another radio unit. The message is then formatted into data blocks by the microprocessor 209 and stored in memory 211. The message is then passed to the DSP 205 for modulation, as described above, and transmission to a destination radio unit (e.g., 102 shown in FIG. 1). For a first transmission to a particular destination radio unit, an initial modulation technique is selected based on a predetermined algorithm—e.g., all first transmissions sent using 64-QAM modulation.

Upon receipt of the transmitted data message by the destination radio, the DSP 205 demodulates the data message using the demodulation technique that corresponds to the modulation technique used to transmit the message. The modulation technique may be discernible by the receiving radio unit in any of several ways. For example, all demodulation techniques corresponding to the known set of possible modulation techniques may be tried, until the correct one is chosen. However, a preferred method is to send a message, over on a separate control channel, that indicates the modulation technique used to transmit the data message.

After the received data message is demodulated by the DSP 205, the demodulated data blocks are passed to the microprocessor 209. In a preferred embodiment, the microprocessor determines—using error detection coding included in the received data blocks—which of the data blocks contain errors. If the entire message is received without error, the data message is passed to data destination unit 114. However, if some of the data blocks in the message contain errors, the data blocks with errors are preferably discarded, while the error-free data blocks are stored in a data buffer in memory 211. At least part of the erroneous message is then re-transmitted, after which the completed, error-free data message is passed to the data destination unit 114.

In a preferred embodiment, a feedback message is constructed in the microprocessor 209 that contains information as to which data blocks were received with errors, and which were received error-free. The feedback message is then passed to the DSP 205 for transmission back to the transmitting radio unit. In this manner, the transmitting radio unit is advised of the current quality of transmission.

In addition, the feedback message might contain information regarding a direct measurement of signal quality made by the DSP upon receipt of the data message. Further, in a preferred embodiment, the feedback message is transmitted using a predetermined modulation technique.

When the feedback message is received and demodulated by the transmitting radio unit 100, the feedback information is passed to the microprocessor 209. The microprocessor then determines which data blocks from the data message were received in error, and need to be re-sent. A new data message is then constructed from the data blocks stored in memory 211. The new data message, which may be the entire message or, as in a preferred embodiment, only those data blocks that were received in error, is then re-transmitted. In an alternate embodiment, blocks from a new data message are included with blocks from a previous data message that require re-transmission.

Another feature of the invention incorporates the use of historical quality information to enhance the modulation selection. In particular, the microprocessor records the number of data blocks in the previously transmitted data message that contained errors, as indicated by the feedback message, in a database located in memory 211. The number of data blocks that were transmitted in the previous data message is also stored in the database. Further, a direct signal quality measurement, if included in the feedback message, is also stored in the database. In a preferred embodiment, the information in the database is updated each time a feedback message is received. In this manner, the transmitting radio unit maintains a history of data channel performance, thereby improving the modulation selection process, as next described.

The data channel history information stored in the database serves as the basis for the selection of a modulation technique, as follows. The ratio of the number of blocks with errors, to the number of blocks transmitted, defines an effective average block error rate for data over the channel. In a preferred embodiment, the error rate calculation takes into account one of several possible weighting factors applied to some of the information—e.g., recent quality information is weighted greater than older information. Alternatively, since modulation techniques differ in terms of their susceptibility to channel errors, the error rates for each of the modulation techniques could be normalized to a single, reference modulation technique. The normalized error rates could then be combined, as later described, to form a single effective error rate. The calculated error rate may then be compared to a set of threshold values—e.g., as stored in memory 211. In a preferred embodiment, each of the possible modulation techniques have a defined upper and lower error rate threshold value that define a region in which that technique outperforms any other technique.

To illustrate how these thresholds might be used, it is assumed that a 10% effective average error rate is calculated from information in the database. It is further assumed that 16-QAM modulation has an upper error threshold of 20%, and a lower error threshold of 2%. These threshold values represent that range of effective average channel error rates over which 16-QAM modulation gives superior performance as compared with the other available modulation techniques. The basis for determining superior performance might be for example, maximizing channel throughput, or minimizing message delay. When the next data message is presented to the DSP for transmission, an indication is also presented to advise the DSP that 16-QAM modulation is to be used to transmit that message.

The calculated error rate might alternatively be used to derive an effective average (S/I+N) ratio, based on a predetermined relationship between average (S/I+N) ratios and average error rates. This derived value may then be compared to stored threshold values for each modulation technique, in a manner similar to that described above, to automatically select the proper modulation technique. In addition, direct signal quality history information could be used as a basis for selection—either alone, or as a weighted combination—with the (S/I+N) ratio calculated from the block error history.

The procedures for automatically selecting the proper modulation technique are preferably to be implemented in the transmitting radio unit. However, the database could be maintained, and the automatic selection of the best modulation technique performed, by the receiving radio unit. In that case, the selected modulation technique would need to be relayed back to the transmitting radio unit in some manner, so the source radio unit can use the selected technique for the next transmission of a data message. The selected technique could be included in the feedback message described above, or alternatively, sent on a separate control channel.

Figure 3:
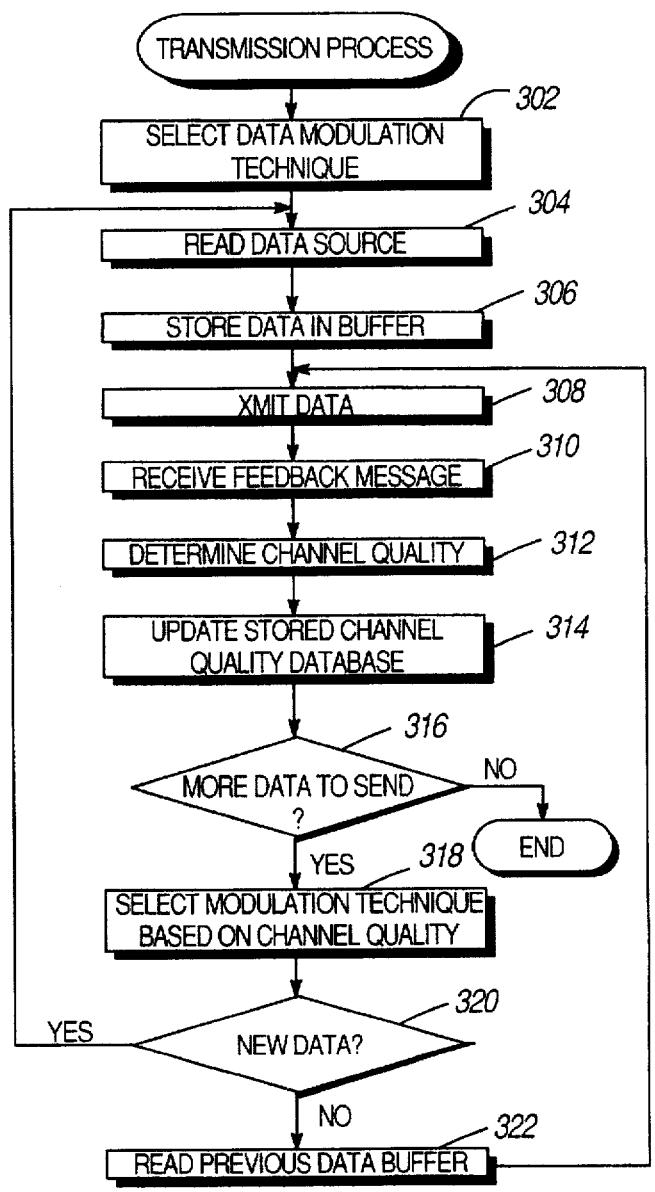
FIG. 3 shows a flow diagram depicting the data transmission process, in accordance with the present invention.

FIG. 3 shows a data flow diagram 300 illustrating the transmission process in accordance with a preferred embodiment of the invention. After selecting (302) an initial data modulation technique, the data source is read (304) to determine the data to be currently transmitted. The data to be currently transmitted is then stored (306) in a storage buffer (e.g., memory 211 shown in FIG. 2). The data is then transmitted (308), as earlier described, and the feedback message is received (310). The transmitting unit then determines (312) the channel quality either directly (e.g., reading the indication sent with feedback message) or by calculating (e.g., using error data sent in the feedback message), as earlier described.

In a preferred embodiment, the channel quality history is kept in a database at the transmitting end, with the database being updated (314) after each transmission. Alternate embodiments might require updating the database on a selective basis—e.g., only after a significant change. It should be noted that data remaining in the database for a predetermined time period might be deleted, as the information may no longer be relevant to current channel conditions. A decision is then reached where it is determined (316) whether or not there is more data to send. If no more data is to be sent, the routine is exited. If there is more data to send, a modulation technique is selected (318) based on the channel quality—i.e., historical and/or current quality information. A decision is then reached to determine (320) whether or not the data to be sent is new data—i.e., data that has not yet been transmitted. If the data to be currently transmitted is new data, the routine returns to block 304, where processing continues. If the information is not new data—e.g., at least portions of the previously transmitted data are to be re-transmitted—the previous data buffer is read (322) and the routine returns to block 308, where the appropriate portions of data are transmitted.

Figure 4:
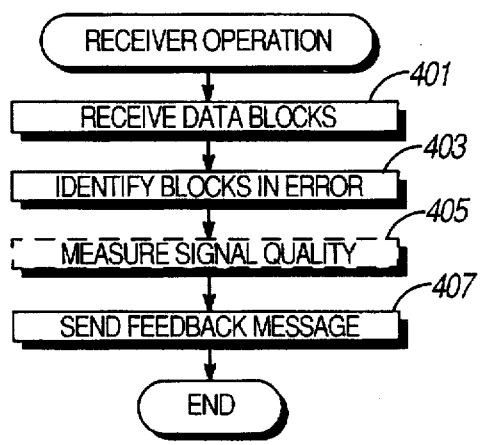
FIG. 4 shows a flow diagram depicting the receiver operation, in accordance with the present invention.

FIG. 4 shows a data flow diagram 400 illustrating the process of receiving a data message, in accordance with a preferred embodiment of the invention. After data blocks are received (401) and demodulated, the blocks having errors are identified (403), as earlier described. A direct measurement of signal quality may also be made (405). The receiving radio unit then generates a feedback message, which might contain an indication of which data blocks were received in error, or an indication of the direct measurement of signal quality. The feedback message is then sent (407) to the radio unit that transmitted the data message.

In the foregoing manner, the present invention allows for adaptive optimization of the transmission channel being employed. In particular, the continually changing quality conditions of the transmission channel are accommodated by automatic selection of available modulation techniques that are better suited for those channel conditions. In so doing, the present invention solves the problem of inefficient utilization of the available bandwidth, as well as the undesired delay characteristics associated with poor channel conditions.

What is claimed is:

1. A method of adaptively selecting from amongst a plurality of data modulation techniques to use when transmitting data comprising the steps of:

in a two-way communication unit:
 transmitting data using a first data modulation technique of said plurality of data modulation techniques;
 receiving a message that includes information that at least reflects upon quality of transmission of the data;
 automatically selecting, as a function of both the information that at least reflects upon quality of transmission of the data and previously stored information that reflects upon quality of previous transmissions of data, a second data modulation technique from said plurality of data modulation techniques; and
 using the second data modulation technique for subsequent transmissions of data.

2. The method of claim 1, wherein said subsequent transmissions of data involves new data.

3. The method of claim 1, wherein said subsequent transmissions of data involves data that was previously transmitted.

4. The method of claim 1, wherein the data modulation techniques include four discrete modulation techniques.

5. The method of claim 4, wherein said four discrete modulation techniques include quadrature phase shift keyed modulation, 16-quadrature amplitude modulation (QAM), 64-QAM, and 256-QAM.

6. The method of claim 1, further including the step of storing the information that at least reflects upon quality of transmission of the data.

7. The method of claim 1, wherein the step of receiving a message that includes information that at least reflects upon quality of transmission of the data involves receiving a direct measurement of signal quality.

8. The method of claim 7, wherein the measurement of signal quality is a function of a ratio of signal to noise-plus-interference.

9. The method of claim 1, wherein the step of receiving a message that includes information that at least reflects upon quality of transmission of the data involves receiving an indication of errors detected during data transmission.

10. The method of claim 9, wherein the step of automatically selecting a second data modulation technique is a function of the indication of errors detected.

11. The method of claim 10, wherein the step of selecting the second data modulation technique as a function of the indication of errors detected involves calculating an estimate of a ratio of signal to noise-plus-interference.

12. A method of adaptively selecting from amongst at least two data modulation techniques to use when transmitting data, comprising the steps of:

in a first two-way communication unit:
 maintaining stored information regarding quality of previous transmissions of data;
 transmitting to a second two-way communication unit at least one block of data using a first data modulation technique from said at least two modulation techniques;
 receiving from the second two-way communication unit at least a selective automatic-repeat-request feedback message;
 automatically selecting, as a function of both information contained in the selective automatic-repeat-request feedback message and the stored information, a second data modulation technique from said at least two data modulation techniques;
 updating the stored information to include at least some of the information contained in the selective automatic-repeat-request feedback message; and
 using the second data modulation technique for subsequent transmissions of data.

* * * * *